Patented Aug. 16, 1932

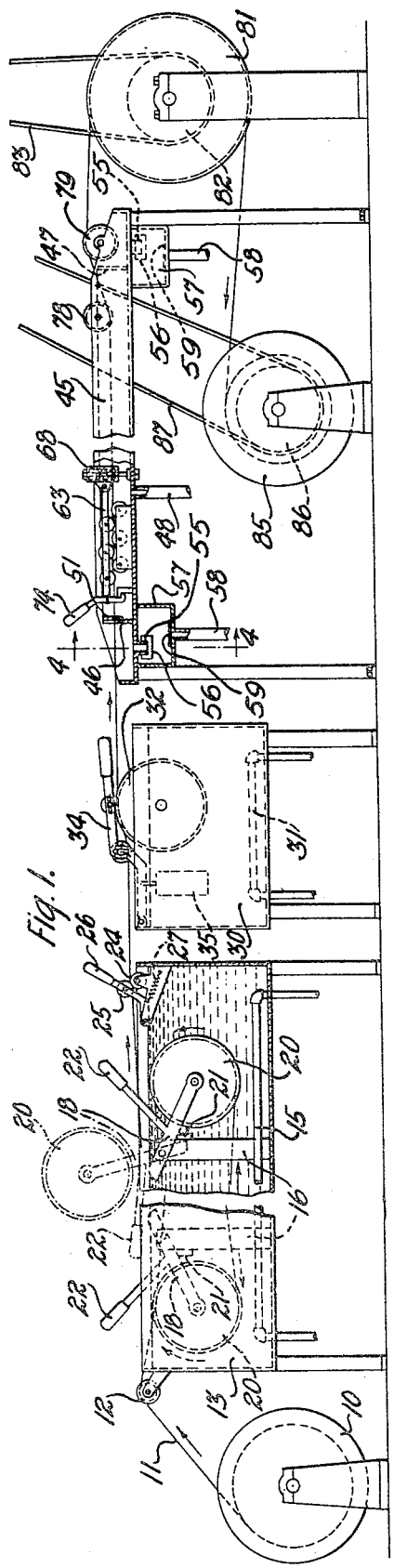

1,871,456

UNITED STATES PATENT OFFICE

RAY CHARLES KIVLEY, OF OAK PARK, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR TREATING MATERIALS

Application filed November 16, 1927. Serial No. 233,729.

This invention relates generally to methods of and apparatus for treating materials, and more particularly to methods of and apparatus for weatherproofing materials such as textile fabrics employed as insulation for conductors in strand form.

Objects of the invention are to provide a method of producing treated materials of uniform quality and size and of pleasing appearance, and to provide a simple, effective and economical apparatus for practicing this method.

In one embodiment of the invention, a rubber insulated wire covered with a fabric insulation is conveyed through an impregnating tank where the fabric is impregnated with a suitable weatherproofing compound. The impregnated fabric is then coated with a second weatherproofing compound and is passed into a cooling tank containing water and through a series of rolls submerged in the water which effect a simultaneous compacting and polishing action on the coated material. After the wire is conveyed through the cooling tank, it is wound upon a storage reel where it may be stored until used.

A clear understanding of the invention may be had from the following detailed description of one embodiment thereof taken in connection with the accompanying drawing illustrating that embodiment, and in which Fig. 1 is a side elevation partially broken away of an apparatus for weatherproofing material;

Fig. 2 is an enlarged detailed view of a plurality of sheaves forming a part thereof;

Fig. 3 is an enlarged sectional view taken on line 3—3 of Fig. 2;

Fig. 4 is an enlarged transverse vertical sectional view thereof taken on line 4—4 of Fig. 1, and Fig. 5 is an enlarged fragmentary longitudinal sectional view of a part of the apparatus disclosed in Fig. 1.

Referring now to the drawing in detail in which like numerals designate like parts throughout the several views, the numeral 10 designates a supply reel upon which is wound a wire 11 covered by a suitable fabric insulation. Adjacent the supply reel is a sheave 12 rotatably mounted upon the end of a tank 13 containing an impregnating compound of any suitable nature, such as petroleum distillates, having a fairly high melting point, which tank is provided with heating means, such as a steam pipe 15, for maintaining the impregnating material in a molten state. Positioned within the tank 13 are a plurality of standards 16—16 upon each of which is pivotally mounted one end of an arm 18 having a grooved roller 20 rotatably secured upon the opposite end thereof. When positioned, as shown in Fig. 1, the arms 18—18 rest upon lugs 21—21 formed upon the standard 16—16, but the arms may be rotated by means of arms 22—22 extending laterally therefrom into the position indicated by dotted lines for one of the arms in Fig. 1, in which position the ends of the arms 18—18 nearest the standards 16—16 are in contact with the lugs 21—21 and the center of gravity of the arms and the rollers mounted thereon is in each case on the side of the pivot point of the arms 18—18 opposite that from which the grooved rollers 20—20 have been rotated. A wiping roll 24 is rotatably mounted at the end of the tank opposite that upon which the sheave 12 is mounted and a companion wiping roll 25 is rotatably mounted upon an arm 26 which is pivotally mounted near the roll 24 so as to be urged by a spring 27 toward the roll 24, as is clearly shown in Fig. 1 of the drawing.

Positioned adjacent the tank 13 is a second tank 30 provided with suitable heating means, such as a steam pipe 31, for maintaining a weatherproofing compound contained in the tank in a molten condition. A sheave 32 partially submerged in the weatherproofing compound is rotatably secured within the tank 30 in alignment with the grooved rollers 20—20 and the wiping rolls 24 and 25, while an arm 34 is pivotally mounted at one end within the tank 30 and is urged downwardly by means of a weight 35. The arm 34 is provided with a slot 37 (Fig. 2) in which a small sheave 40 is adjustably positioned in proximity to the sheave 32, and a sheave 41 is adjustably positioned in a slot 38 in the arm 34 in such a position as to coact with the sheave 32 to form a die through which the wire is drawn, as is clearly shown in Figs. 2 and 3.

Positioned adjacent the tank 30 and in alignment with that tank and with the tank 13 is an elongated cooling tank or trough 45 having weirs 46 and 47 positioned at opposite ends thereof and provided with an inlet pipe 48 for admitting a cooling liquid, such as water, into the tank. The weir 46 has a slot 50 (Figs. 4 and 5) formed therein which is covered by a piece of sheet rubber 51 having a circular opening 52 formed therein in alignment with the sheave 32 in the tank 30 and having a slot 53 extending from the opening 52 to the upper side of the sheet 51 to permit the insertion of the insulated wire into the opening 52. Drain pipes 55—55 are provided at the opposite end of the tank 45 through which the liquid flowing over the weirs 46 and 47 may be conveyed through basket strainers 56—56 into drain compartments 57—57 provided with drain pipes 58—58 and having screens 59—59 positioned therein over the drain pipes 58—58.

Rotatably positioned within the tank 45 adjacent the weir 46 are a plurality of rolls 61—61 (Fig. 5) and a plurality of companion rolls 62—62 are rotatably mounted in staggered relation thereto upon an arm 63 pivotally mounted adjacent the rolls 61—61. A bolt 65 rigidly positioned within the bottom of the tank 45 extends vertically therefrom and a collar 66 mounted upon the bolt 65 coacts with a coil spring 67 to urge a hollow cylindrical member 68, upon which the arm 63 is pivotally mounted, in a downward direction through an apertured plug 70 threaded into the end of the cylindrical member 68, a nut 71 threaded upon the end of the bolt 65 serving as a stop to limit the movement of the cylindrical member 68. A lever 73 provided at its upper end with a handle 74 and having a hook 75 formed upon the lower end thereof is pivotally mounted upon the end of the arm 63 opposite the end adjacent the cylindrical member 68 so that the hook 75 may coact with a flanged plate 76 to latch the rolls 62—62 in operative relation with the rolls 61—61.

A sheave 78 is rotatably mounted near the exit end of the tank 45 for maintaining the wire beneath the surface of the liquid within the tank, while a sheave 79 is rotatably mounted near the same end of the tank beyond the weir 47 for guiding the wire over the weir. A capstan 81 driven in any suitable manner, such as by a pulley 82 and a belt 83, is positioned near the outlet end of the tank 45 for drawing the insulated wire through the tanks 13, 30 and 45, and a take-up reel 85 driven by any suitable means, such as by a pulley 86 and a belt 87, is positioned so as to receive the wire now covered with a weatherproof insulating material from the capstan 81.

The operation of the apparatus is as follows: The grooved rollers 20—20 are withdrawn from the tank 13 by means of the arms 22—22 into the position shown by dotted lines for one of the rollers in Fig. 1, the tank 13 is filled with a weatherproofing compound, such as a petroleum distillate having a fairly high melting point, to a level above the upper edges of the grooved rollers 20—20 when the latter members are positioned within the tank 13, and steam is admitted into the pipe 15 to melt the compound and retain it in a molten state. The tank 30 is filled with a weatherproofing compound which in its solid state is comparatively hard and lustrous and which may consist of any suitable materials, such as a mixture of Montan wax and a petroleum distillate having a higher melting point than the compound employed in the tank 13, and steam is supplied to the pipe 31 for the purpose of melting the weatherproofing compound and maintaining it in a molten state. The wire 11, which is covered with a suitable fabric insulation, is threaded over the sheave 12, is wound back and forth upon the grooved rollers 20—20 in the directions indicated by the arrows in Fig. 1, is passed between the wiping rolls 24 and 25, and the rollers 20—20 are lowered by means of the arms 22—22 into the compound contained in the tank 13, the wire 11 meanwhile unwinding freely from the supply reel 10 to permit the wire to conform to the altered position of the rollers. The arm 34 is raised, the wire threaded over the sheave 32, and the arm 34 lowered to cause the smaller sheaves 40 and 41 to come into engagement with the wire. The arm 73 is rotated by means of the handle 74 so as to release the hook 75 from engagement with the flanged plate 76 and the arm 63 is then raised to withdraw the rolls 62—62 from their operative position. The wire 11 is next forced through the slit 53 in the rubber sheet 51 into the opening 52 in the sheet, the wire is threaded over the rolls 61—61, the arm 63 is rotated in a counter-clockwise direction, as shown in Fig. 5, to bring the rolls 62—62 into engagement with the wire 11 and the arm 63 is latched by means of the hook 75 in the position shown in Fig. 5. The wire is finally threaded beneath the sheave 78, over the sheave 79, around the capstan 81 and onto the take-up reel 85.

A cooling liquid, such as water, is introduced through the inlet pipe 48 into the tank 45 and the supply of the liquid is regulated so that a small quantity of the liquid will flow over each of the weirs 46 and 47 in a continuous stream. Power is then supplied to the mechanisms (not shown) for driving the capstan 81 and the take-up reel 85 whereupon the wire 11 will be conveyed through the above described members of the apparatus.

Since the compound contained in the tank 13 is heated to a temperature above its melting point, the compound will be quite fluid and will penetrate into the interior of the fabric insulation upon the wire as it is conveyed back and forth through the compound over the grooved rollers 20—20, and as the impregnated material is drawn from the tank 13 any excess material is removed therefrom by the wiping rolls 24 and 25. The sheave 32 is rotated by the frictional contact of the wire thereon, which contact is maintained by the pressure exerted upon the wire by the weight 35 through the sheaves 40 and 41, and as the sheave 32 is rotated it conveys a sufficient quantity of the weatherproofing compound contained in the tank 30 upon its surface to coat the impregnated wire passing thereover from the tank 13 with a substantial coating of the compound. The impregnated and coated wire is next conveyed into the cooling liquid contained in the tank 45 through the opening 52 in the rubber sheet 51 without first coming into contact with any of the members of the apparatus, so that none of the coating compound is removed therefrom before it has had an opportunity to be solidified by the cooling action of the liquid within the tank 45. By the time the treated wire is conveyed into engagement with the rolls 61—61 and 62—62, the weatherproofing material upon the surface thereof has reached a semi-plastic stage and the rolls effect a simultaneous compacting and polishing action upon the compound as it is conveyed therebetween, the compound meanwhile hardening due to the cooling action of the liquid surrounding it. The treated material is maintained beneath the surface of the cooling liquid to completely harden the compound thereon during the remainder of its travel through the tank 45 by means of the sheave 78, and as it emerges from the tank 45 it passes over the sheave 79 which causes it to clear the top of the weir 47. The treated wire then passes around the capstan 81 and is wound upon the take-up reel 86 where it may be stored until used.

By designing the supports 16—16 and the arms 18—18 upon which the grooved rollers 20—20 are mounted so that the rollers may be withdrawn from the compound contained within the tank 13, it is possible to wind the wire back and forth upon the rollers without the necessity of withdrawing the compound from the tank 13, or of retaining the compound within the tank and attempting to thread the wire over the rollers while immersed therein. The quantity of weatherproofing compound placed upon the surface of the impregnated material by the sheave 32 is determined by a number of factors, such as the size and shape of the sheaves 32 and 41, the tension on the wire and the speed of the wire and the arc of contact of the wire with the sheave 32. With the other factors fixed, variations in the amount of coating may be readily produced by varying the arc of contact and the desired arc may be obtained by a proper adjustment of the sheaves 40 and 41 within the slots in the arm 34. As will be readily seen from an examination of Fig. 2, the arc of contact between the wire 11 and the sheave 32 will be greatest when the sheave 40 is positioned at the lowermost end of the slot 37 and the sheave 41 is positioned at the extreme right hand end of the slot 38 in the arm 34, and that different arcs of contact may be obtained by shifting the positions of the sheaves 40 and 41 within the slots 37 and 38 in the arm 34. In order to obtain the desired compacting and polishing effect upon the weatherproofing compound, the force exerted upon the wire 11 by the rolls 61—61 and 62—62 may be varied by shifting the position of the collar 66 upon the bolt 65 to increase or decrease the pressure of the spring 67 upon the plug 70 in the cylindrical member 68. Any pieces of the solidified weatherproofing compounds which are removed in the tank 45 are carried by the liquid flowing over the weirs 46 and 47 to the drain pipes 55—55 and are caught by either the basket strainers 56—56 or the screens 59—59 from which the pieces may be removed at intervals and salvaged.

By practicing the above outlined method and by employing the above described apparatus in practicing that method, materials such as fabric insulation employed upon conductors in strand form may be rendered weatherproof in a very simple, effective and economical manner and the resulting product is of uniform quality and of pleasing appearance. It is, of course, to be understood, however, that the specific apparatus described hereinbefore is only one of a number of embodiments of the invention and that various changes in the dimensions and arrangements of the parts may be made without departing from the scope of the invention as defined in the annexed claims.

What is claimed is:

1. A method of weatherproofing material, which consists in coating a material with a weatherproofing compound, immersing the coated material in water, and compacting and polishing the compound upon the material while the coated material is submerged in the water.

2. A method of weatherproofing material, which consists in coating a material with a hot, thermoplastic weatherproofing material, immersing the coated material in water to harden the compound thereon, compacting the compound upon the material while the compound is hardening in the water, and polishing the compound upon the material while the material is submerged in the water.

3. A method of weatherproofing material, which consists in impregnating a material with one hot weatherproofing compound, coating the impregnating material with another hot weatherproofing compound, and simultaneously cooling, compacting and polishing the latter compound on the material while the coated material is submerged in water.

4. A method of weatherproofing insulating material upon conductors in strand form, which consists in conveying an insulated conductor through a body of weatherproofing compound, removing the excess compound, coating the impregnaed material with a hot compound of different character, conveying the coated material into a body of water to harden the compounds, and simultaneously compacting and polishing the compounds upon the material while hardening in the water.

5. A method of weatherproofing insulating fabric, which consists in conveying a conductor insulated fabric through a body of molten weatherproofing compound to impregnate the insulating material therewith, removing the excess compound, coating the impregnated material with a molten compound of different character, conveying the thus treated material into a body of water to solidify the compounds, and simultaneously compacting and polishing the compounds upon the material while the material is submerged in the water.

6. An apparatus for weatherproofing materials, which comprises means for impregnating material with one compound, means for coating the impregnated material with another compound, a tank for containing water into which the treated material may be conveyed, and a plurality of submerged rolls disposed in staggered relation in the tank for compacting and polishing the compounds upon the material.

7. In an apparatus for weatherproofing material, means for treating a material with a molten weatherproofing compound, a cooling tank containing water into which the treated material may be conveyed to solidify the compound, a plurality of opposed rows of submerged staggered rolls in the tank for compacting and polishing the compound upon the material while immersed in the water, and spring means for yieldingly forcing the rolls into contact with material.

8. An apparatus for weatherproofing material, which comprises means for treating material with a hot weatherproofing compound, means comprising a tank containing water in which the treated material may be submerged for hardening the compound upon the material, and a second means for compacting and polishing the compound upon the material while it is submerged.

9. An apparatus for coating strands, comprising a receptacle for coating material, a grooved roller having its lower portion extending into the material in said receptacle, and a sheave mounted adjacent the upper portion of said roller and having it periphery shaped to coact with the groove of the roller to form a die for forming the coating material on the strand.

10. An apparatus for coating strands, comprising a receptacle for coating material, a roller having its lower portion extending into the material in the receptacle and provided with a peripheral groove to receive the strand, a die member coacting with said groove at its upper portion to form the material applied to the strand by the roller, and an adjustable sheave for varying the arc of contact between the strand and the roller.

In witness whereof, I hereunto subscribe my name this second day of November A. D., 1927.

RAY CHARLES KIVLEY.